United States Patent

Chiang

Patent Number: 5,225,646
Date of Patent: Jul. 6, 1993

[54] INSULATING DEVICE FOR AN ELECTRIC DISCHARGE MACHINE

[76] Inventor: Chin-Fong Chiang, No. 22, Yung-Chi St., N. Dist., Taichung City, Taiwan

[21] Appl. No.: 764,881

[22] Filed: Sep. 24, 1991

[51] Int. Cl.⁵ .......................... B23H 1/00; B23H 7/30
[52] U.S. Cl. ............................ 219/69.11; 74/89.15; 74/DIG. 10; 219/69.2
[58] Field of Search .................... 219/69.11, 69.2; 310/45, 83; 74/89.15, DIG. 10

[56] References Cited

U.S. PATENT DOCUMENTS

| | | | |
|---|---|---|---|
| 3,698,257 | 10/1972 | Ballentine et al. | 74/DIG. 10 |
| 3,975,968 | 8/1976 | Chaffin | 74/89.15 |
| 4,393,319 | 7/1983 | Bock | 310/83 |
| 4,628,171 | 12/1986 | Colby et al. | 219/69.2 |
| 4,705,932 | 11/1987 | Aso et al. | 219/69.2 |
| 4,804,814 | 2/1989 | Southerland et al. | 219/69.2 |
| 5,086,201 | 2/1992 | Grypczynski et al. | 219/69.2 |

Primary Examiner—Geoffrey S. Evans
Attorney, Agent, or Firm—Harness, Dickey & Pierce

[57] ABSTRACT

An electric discharge machine has a movable ram assembly including a casing having a tubular support defining a through bore therein with an upper portion, a lower portion and a receiving space adjacent to the lower portion. A shaft vertically passes through the bore and the lower end of the shaft is connected to an electrode head. A device for moving the shaft vertically in the tubular support is provided in the casing. The casing also has an upper telescopic member extending upward from the upper portion and a lower telescopic member extending from the lower portion thereof. An insulating device is provided between the shaft and the tubular support to insulate the casing from the shaft. The insulating device includes an insulated tubular member in the lower portion, an insulated sleeve member around the shaft between the upper and lower portions, an insulated stop member at the top end of the shaft. A bearing member in the insulated tubular member and the insulated sleeve member holds the shaft vertically in the tubular support of the casing.

9 Claims, 7 Drawing Sheets

INSULATING DEVICE FOR AN ELECTRIC DISCHARGE MACHINE

BACKGROUND OF THE INVENTION

1. FIELD OF THE INVENTION

The invention relates to an electric discharge machine, more particularly to one having a movable ram assembly carrying a vertically movable shaft to directly hold an electrode head, said shaft being electrically insulated from the casing of the ram assembly.

2. DESCRIPTION OF THE RELATED ART

Electric discharge (or electric-spark) machining is a metal-removal process in which materials that conduct electricity are removed by electric sparks. This process is used to form holes of varied shape in materials of poor machinability and to form cavities in steel dies. Machining of a stationary workpiece is accomplished without any grinding or cutting operation so that the workpiece is not subjected to external forces which may cause undesired deformation thereto. EDMs possess a high degree of precision and can be used for relatively long periods. These machines are preferred if accurate machining is desired.

FIG. 1 is an illustration of a conventional electric discharge machine. It mainly comprises a main machine assembly (1), a support stand (2), a movable ram assembly (3) having a vertical shaft therein (not depicted) and mounted on the support stand (2), an electrode head (4) carried by the movable ram assembly (3) and a casing (5) for safe protection of a metal workpiece provided immediately under the electrode head (4) and held in a stationary position by a workbench on the main machine assembly (1).

As illustrated in FIG. 2, the movable ram assembly (3) is drivingly coupled to a servomechanism (not shown) and a tool electrode (not shown) is attached to the electrode head (4) coaxially with the ram assembly (3) via an insulating plate (4a). Thus the electrode head (4) is electrically insulated from the movable ram assembly of the electric discharge machine.

The above-mentioned electric discharge machine has the following drawbacks:

(1) Since an electric discharge machine is a high precision machine, the mounting of said insulating plate (4a) must be very accurate and precise. The deviation in the alignment of the axis of the vertical shaft of the ram assembly (3) and the axis of the shaft (not shown) of the electrode head (4) would significantly affect the accuracy in machining a workpiece. Since the ram assembly (3) and the electrode head (4) are electrically insulated by a flat insulating plate (4a), it is difficult to align the axes of the shaft of the electrode head (4) with that of the shaft of the ram assembly (3).

(2) The insulating plate (4a) is attached to the casing of the ram assembly (3) by means of screws (4d) through openings in the insulating plate. The openings must be exactly equal to the size of the screw (4d), any clearance left in the opening can cause error in the alignment of the ram assembly (3) and the electrode head (4).

(3) Frequent adjustment is necessary to correct the position of the electrode head (4).

SUMMARY OF THE INVENTION

It is therefore, the main object of the present invention to provide an electric discharge machine which is clear of the above-mentioned drawbacks.

Another object of the present invention to provide an electric discharge machine with a ram assembly having a single shaft extending through the casing of the ram assembly to the electrode head and properly insulated from the casing thereby eliminating the need to center the electrode head with the ram assembly.

According to the present invention, the electric discharge machine accordingly includes a ram assembly having a casing with a tubular support, defining a through bore therein with an upper portion, a lower portion and a receiving space adjacent to the lower portion thereof. A shaft vertically passes through the through bore of the tubular support. An electrical insulating device is provided between the tubular support and the shaft. A moving device for moving the shaft in the through bore of tubular support, is received in the receiving space. The insulating device includes a tubular insulating member in the lower portion around the shaft, an insulating sleeve member around the shaft between the upper portion and the lower portion, an insulating stop member attached to the top end of the shaft and a tubular positioning plate attached to the lower portion of the bore.

BRIEF DESCRIPTION OF THE DRAWINGS

Other features and advantages of the present invention will become more apparent in the following detailed description, including drawings, all of which show a non-limiting form of the invention, and of which.

DETAILED DESCRIPTION OF THE PREFERRED EMBODIMENT

It is to be understood that the construction of an electric discharge machine is all similar to prior art. The present invention is to provide an insulating device to be added in the construction of the electric discharge machine so that the machine will not have the drawbacks as previously stated.

Figure 1:
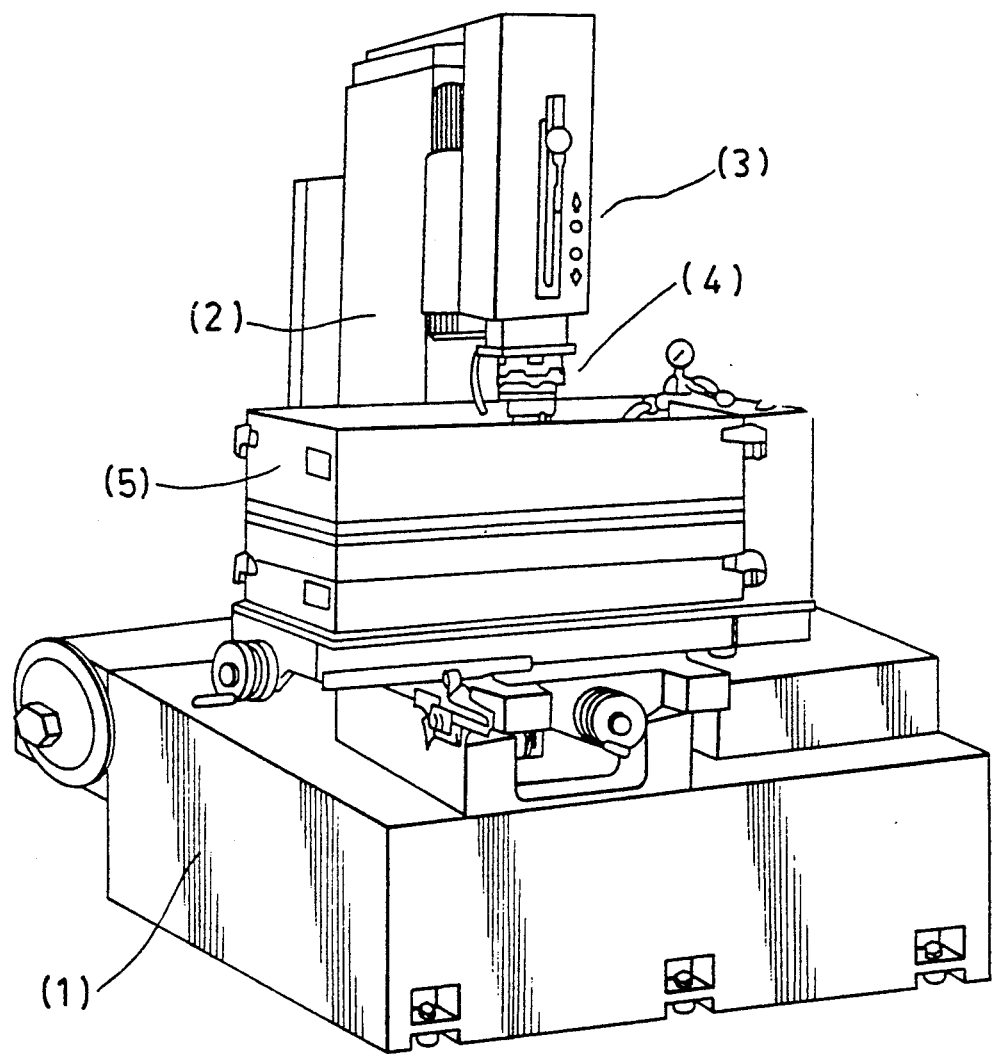
FIG. 1 is a perspective, schematic view of an electric discharge machine of prior art.
Figure 2:
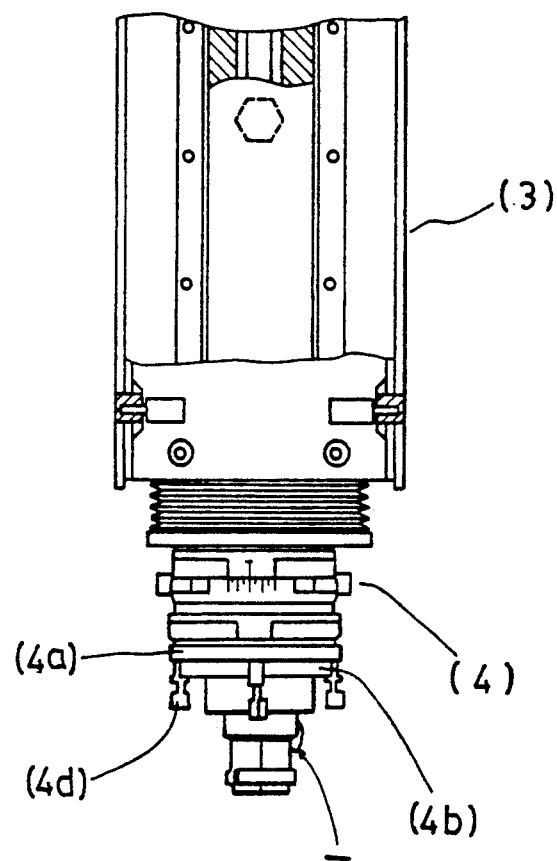
FIG. 2 shows a movable ram assembly and an electrode head of the electric discharge machine of FIG. 1.
Figure 3:
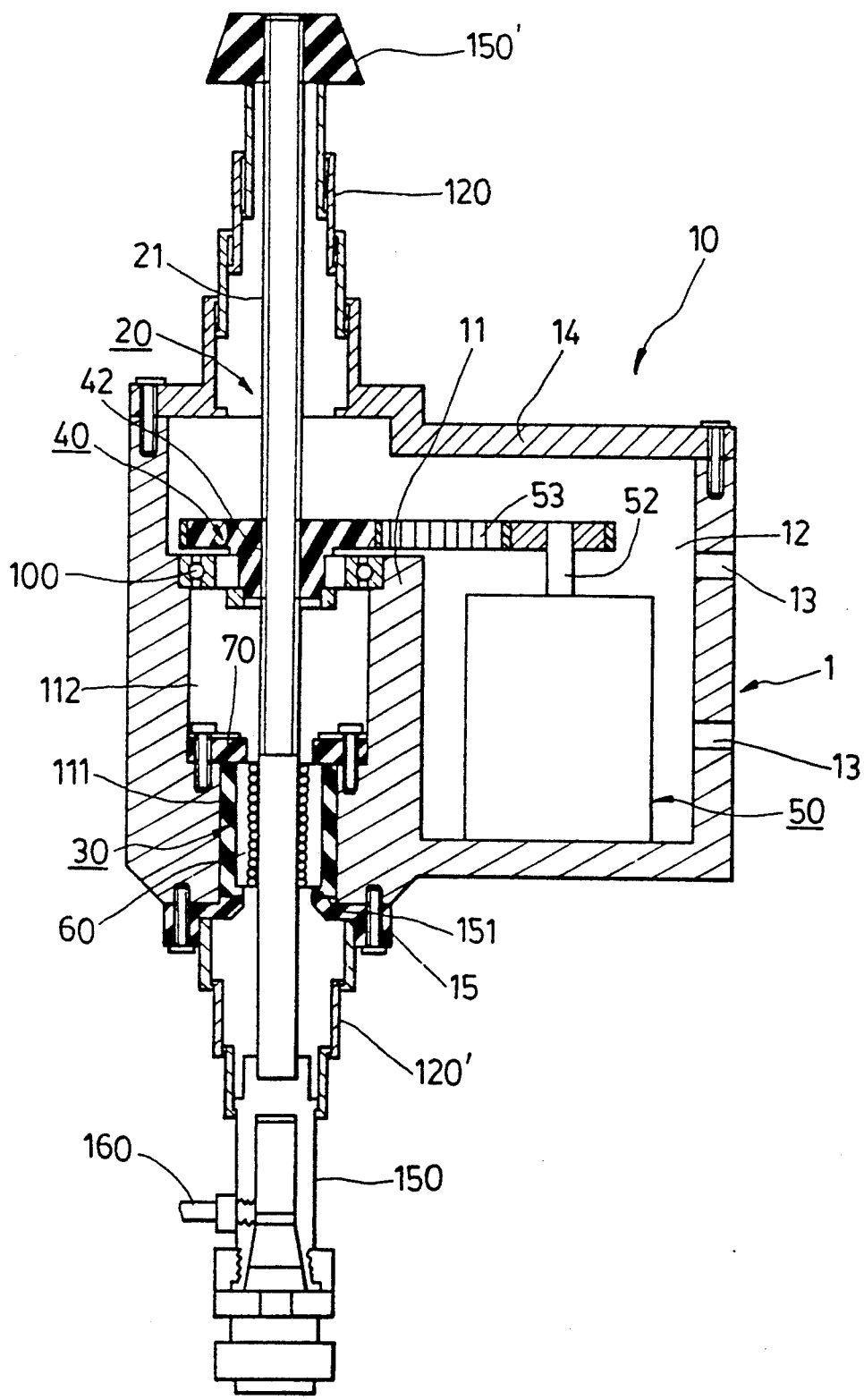
FIG. 3 shows an electric discharge machine with an insulating device of the present invention for electrically insulating the casing of the ram assembly and a vertical shaft provided therein.

Referring to FIG. 3, the ram assembly of an electric discharge machine shown, is constructed according to the insulating device of the present invention. As depicted, the ram assembly (10) includes a casing (1) having a tubular support (11) therein and defining a through bore (112) including an upper portion and a lower portion and a receiving space (12) adjacent to the lower portion of the casing (1), a shaft (20) vertically provided in the bore (112), an electrical insulating device for electrically insulating the vertical shaft (20) from the casing (1), means for moving the vertical shaft (20) in the bore (112) so as to adjust the range of a gap between an electrode tool connected to a lower end of the shaft and a workpiece clamped on a workbench of the electric discharge machine. An upper lid (14) is provided at the upper portion of the casing.

The tubular support (11) has an annular flange (111) projecting inwardly at the lower portion thereof. A first bearing member (60) is provided within the annular flange (111) and a second bearing member (100) is provided in the bore adjacent to the upper portion thereof by any suitable known method.

The vertical shaft (20) passes through the bore (112) and its two free ends respectively extend out from the upper portion and the lower portion of the casing. An electrode head (150) is connected to the lower end of the shaft (20) and a cooling media (160) is connected to the electrode head (150) in order to cool down the temperature which rises during machining of a workpiece and an insulating stop member (150') is connected to the top end of the shaft (20).

The moving means includes a driving unit (50), such as a motor, disposed in the receiving space (12) and having a driving shaft (52) which is in connection with an insulating sleeve member (40) mounted around the shaft (20) in the upper portion of the tubular support (11) by the second bearing member (100). A transmission gear (53) connects the driving shaft (52) of the motor and the insulating sleeve member (40). It is important to note here that the insulating sleeve (52) has a toothed outer periphery engaged with the transmission gear (53) and an inner periphery (42) engaged with a screw thread portion (21) of the vertical shaft (20) so that the rotation of the insulating sleeve member (52) in the upper portion of the tubular support (112) moves the shaft (20) axially therein.

The upper portion of the tubular support (11) has an upper telescopic member (120) projecting upward, connecting with the insulating stop member (150') and the lower portion having a bottom tubular lid (151), made of an insulating material, from which a lower telescopic member (120') extends downward in association with the electrode head.

The electrical insulating device includes a tubular insulating member (30) mounted around the first bearing member (60) in the lower portion of the tubular support so that the shaft (20) is held electrically insulated from the casing (1) by the tubular insulating member (30), the insulating sleeve member (40), the insulated stop member (150') and the insulated bottom lid (15). The tubular insulating member (30) is held firm in the lower portion of the tubular support (11) by an inwardly projection (151) of the insulated bottom lid and an insulated annular positioning plate (70) by a known related art.

Figure 4:
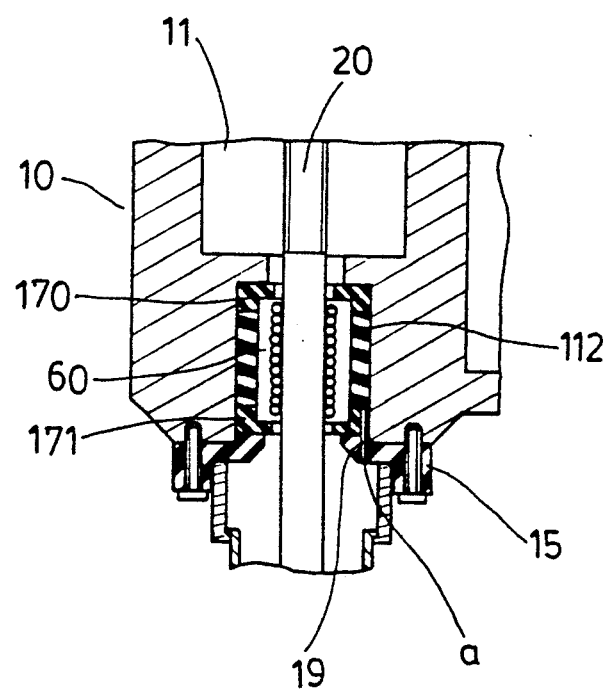
FIG. 4 shows a detailed view of an insulating member of the insulating device of the present invention employed in an electric discharge machine.

In one embodiment, the first bearing member (60) can be capped by two insulated plates (170,171) with an annular space being formed between the two insulated plates in the lower portion of the tubular support (11) as shown in FIG. 4. An insulating fluid (a) can be injected into the annular space through an opening (19) formed in the insulated bottom lid (15) of the casing (1). A rigid insulating tubular member (60) is obtained when the fluid is hardened.

Figure 5:
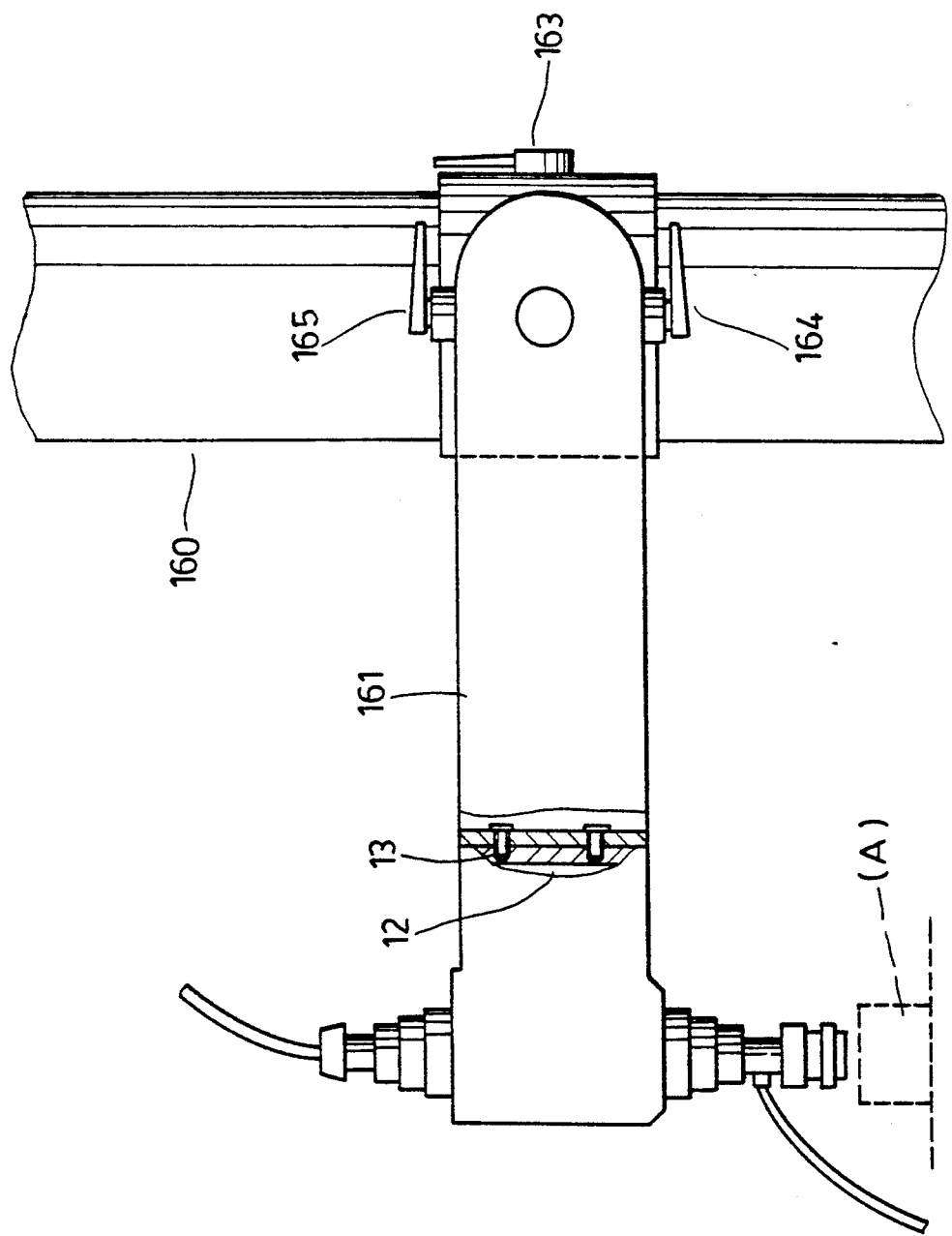
FIG. 5 shows the electric discharge machine with the insulating device of the present invention in one possible application.

Since the electrode head (150) in this invention is formed on the lower end of the shaft (20), deviation of the axes of the electrode head (150) and the shaft (20) does not exist in the electric discharge machine equipped with the insulating device of the present invention. Correspondingly, frequent correction of the insulating members is not needed either. Thus an EDM constructed in accordance with the present invention will undoubtedly provide more accuracy in the machining of a workpiece. Since the casing (1) has a plurality of lateral mounting holes 13, the casing 10 can be detachably attached to a rotatable arm 161 of a machine 160. The machine 160 includes a plurality of fixing buttons (163,164,165) which can be adjusted in order for the arm 161 to be positioned at a desired height and angle with respect to a workpiece (A) upon which the electric discharge machine with the present insulating device can work. Thus a workpiece which needs to be machined by the electric discharge machine is not required to be dismantled from the workbench of a mother machine 160. Please see FIG. 5.

Figure 6:
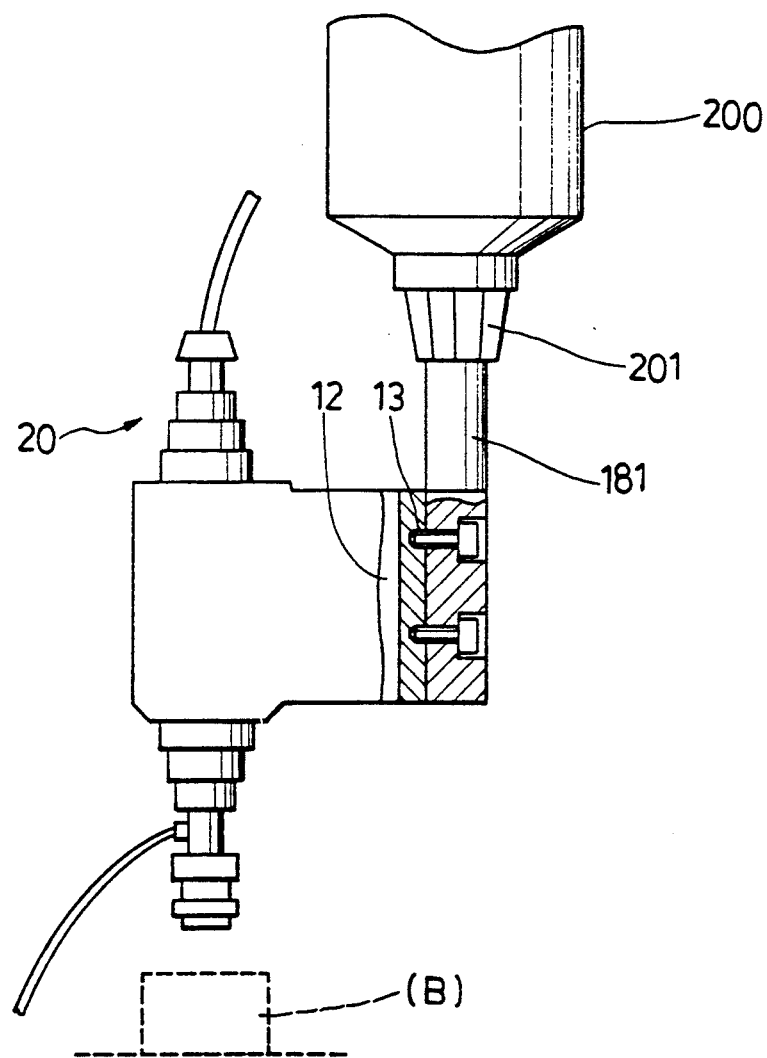
FIG. 6 shows the electric discharge machine with the insulating device of the present invention in a second possible application.

As shown in FIG. 6 in one embodiment, the arm 181 to which the electric discharge machine 20 is attached in the above-mentioned manner, is clamped by a clamping member 201 of a mother machine 200, such as a Computerized Numerical Control milling machine, as shown in FIG. 6. In the event that a workpiece (B) which has been machined by the mother machine 200 needs to be machined by electric discharge, it can be directly machined in a sery without postponement.

Figure 7:
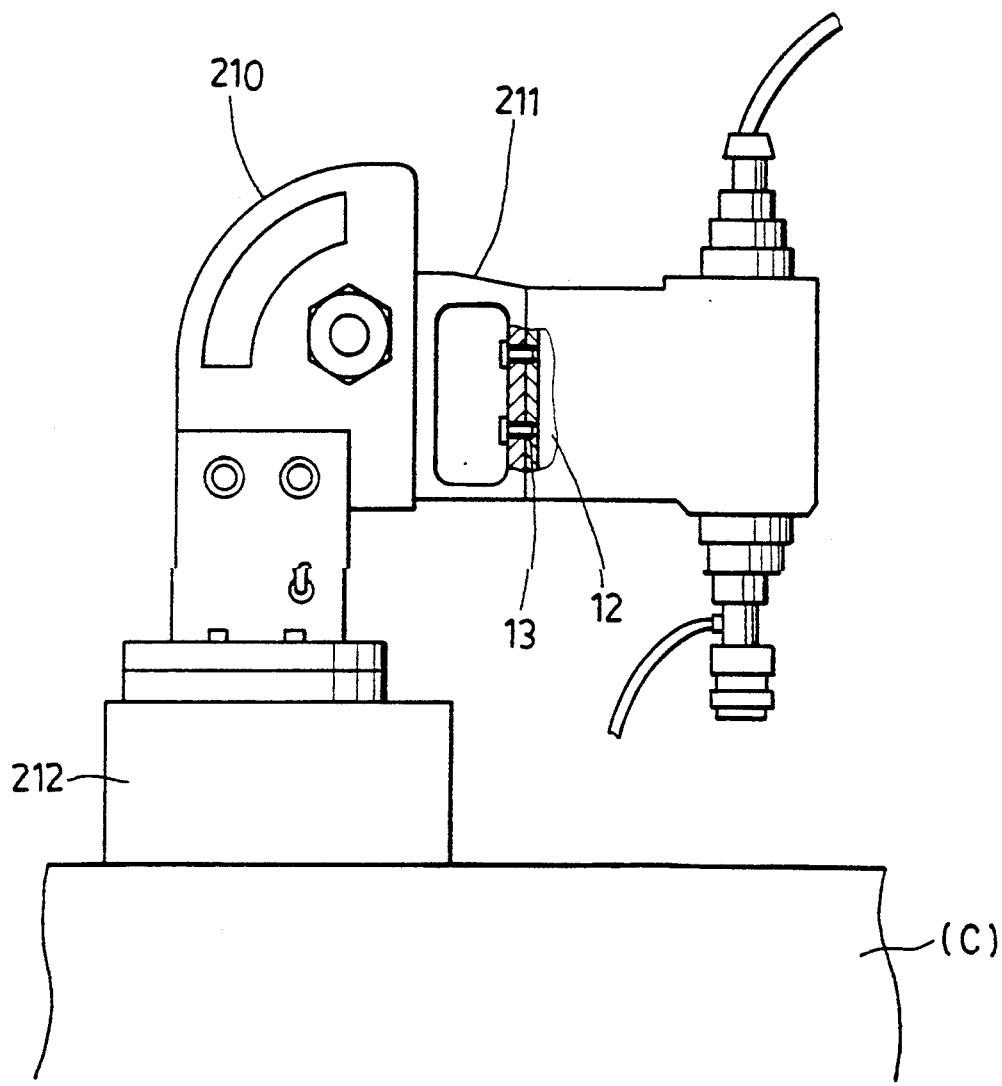
FIG. 7 shows the electric discharge machine with the insulating device of the present invention in a third possible application.

As shown in FIG. 7 if the workpiece (C) to be machined by the electric machine is large, the electric machine 20 is firstly attached to an arm 211 of a support 210, the bottom of which has a magnetic plate 212 thereof. Since the magnetic plate 212 can stick on a workpiece firmly, the electric discharge machine 20 can therefore machine on the workpiece (C).

With the above explanation, it is obvious to those skilled in the art that the electric discharge machine with the isolating device of the present invention is far better than prior art isolating devices that various modifications and variations can be made without departing from scope and spirit of the present invention. It is therefore intended that these claims only be limited to the appended claims.

I claim:

1. An electric discharge machine including a frame, a support arm means mounted to said frame, a ram assembly movably mounted on said support arm means, said ram assembly comprising:
    a casing having a tubular support therein defining a through bore with an upper portion and a lower portion and a receiving space adjacent to said lower portion;
    a shaft passing through said bore and having a top end, bottom end and a threaded portion intermediate said ends;
    an electrical insulating means provided between said shaft and said tubular support;
    means for moving said shaft axially in said through bore associated with said tubular support and said insulating means, said means for moving including an electrically insulating sleeve member rotatably supported within said casing and threadedly engaging said threaded portion of said shaft and means for rotatably driving said insulating sleeve member whereby rotational movement of said sleeve member effects axial movement of said shaft relative to said casing; and an electrode head being connected to said bottom end of said shaft.

2. An electric discharge machine as claimed in claim 1, wherein said driving means include motor means secured within said casing and gear means drivingly coupling said motor means to said insulating sleeve member.

3. An electric discharge machine as claimed in claim 1, wherein said tubular support has an annular flange projecting inward adjacent to said lower portion of said bore and a first bearing member within said annular flange, said insulating means includes a tubular insulating member mounted around said first bearing member to hold said shaft centrally thereof.

4. An electric discharge machine as claimed in claim 3, wherein said tubular support further has a second bearing member mounted therein between said upper portion and said lower portion of said bore, said moving means including a power means provided in said receiving space and a transmission gear which connects said power means to an insulating sleeve member provided around said shaft in said second bearing member, said insulating sleeve member having a toothed outer periphery engaged with said transmission gear and an inner periphery engaging with said screw thread to move said shaft vertically when said sleeve member is rotated.

5. An electric discharge machine as claimed in claim 3, wherein said casing further comprising a tubular insulated positioning member fixed to said lower portion of said bore, said insulating means further includes an annular insulated positioning plate provided in said lower portion of said bore, said tubular insulating member being held firmly in said bore by said annular insulated positioning plate and said tubular insulated positioning member.

6. An electric discharge machine as claimed in claim 5, wherein said top end of said shaft has an insulated stop member associated with said upper telescopic sleeve.

7. An electric discharge machine as claimed in claim 3, wherein said casing further comprises an upper telescopic sleeve provided at said upper portion of said bore around said shaft and projecting upward, and a lower telescopic sleeve provided at said lower portion of said bore around said shaft and projecting downward, said bottom end of said shaft extends downward and outward from said lower telescopic sleeve.

8. An electric discharge machine as claimed in claim 3, wherein said casing further has a plurality of lateral holes.

9. An electric discharge machine as claimed in claim 3, wherein said tubular support further has two annular insulated caps provided on said first bearing member in such a manner that an annular space is formed around said first bearing member, said tubular insulating member is formed by hardening when an insulating fluid is injected into said annular space.

* * * * *